US012704890B2

(12) United States Patent
Dasalukunte et al.

(10) Patent No.: US 12,704,890 B2
(45) Date of Patent: Aug. 11, 2026

(54) CHIP AND PLATFORM LEVEL POWER MONITORING AND SEQUENCING FOR ROBUST STARTUP AND MODE SWITCHING

(71) Applicant: Intel Corporation, Santa Clara, CA (US)

(72) Inventors: Deepak Dasalukunte, Beaverton, OR (US); Amy Whitcombe, Saratoga, CA (US); Finbarr O'Regan, Innishannon (IE); Conor O'Keeffe, Cork (IE); Sundar Krishnamurthy, Dublin (IE)

(73) Assignee: Intel Corporation, Santa Clara, CA (US)

(*) Notice: Subject to any disclaimer, the term of this patent is extended or adjusted under 35 U.S.C. 154(b) by 0 days.

(21) Appl. No.: 17/957,052

(22) Filed: Sep. 30, 2022

(65) Prior Publication Data

US 2024/0111346 A1 Apr. 4, 2024

(51) Int. Cl.
*G06F 1/00* (2006.01)
*G06F 1/26* (2006.01)

(52) U.S. Cl.
CPC .................................. *G06F 1/26* (2013.01)

(58) Field of Classification Search
CPC .......... G06F 1/26; G06F 1/3209; G06F 1/324; G06F 1/3287; H04W 84/06; H04W 52/028; Y02D 10/00
See application file for complete search history.

(56) References Cited

U.S. PATENT DOCUMENTS 6,367,021 B1 * 4/2002 Shay ......................... G06F 1/24 713/323
9,939,834 B2 * 4/2018 Bodas ....................... G05F 1/66
11,221,643 B2 * 1/2022 Malevsky ................. H03L 5/02
2015/0323967 A1 * 11/2015 Aoyagi ................. G06F 1/3296 327/540
2017/0353614 A1 * 12/2017 Nagata ............... H04N 1/00116
2021/0405941 A1 * 12/2021 Takizawa ............. G06F 3/1236

OTHER PUBLICATIONS

Bhagavatula, S., "A power sensor with 80ns response time for power management in microprocessors", IEEE Custom Integrated Circuits Conference, (Sep. 2013), 4 pgs.
Cochet, M., "On-Chip Supply Power Measurement and Waveform Reconstruction in a 28nm FD-SOI Processor SoC", IEEE ASSCC, (2016), 4 pgs.
Keller, B., "Sub-microsecond adaptive voltage scaling in a 28nm FD-SOI processor SoC", IEEE European Solid-State Circuits Conference, (Sep. 2016), 4 pgs.
Whatmough, P. N., "An all-digital power-delivery monitor for analysis of a 28nm dual-core Arm Cortex-A57 cluster", IEEE International Solid-State Circuits Conference, (Feb. 2015).

* cited by examiner

*Primary Examiner* — Xuxing Chen
(74) *Attorney, Agent, or Firm* — Schwegman Lundberg & Woessner, P.A.

(57) ABSTRACT

An apparatus can include at least two circuit portions having separate power sequencer circuitry. The apparatus can further include processing circuitry configured to control at least one portion of the at least two circuit portions to operate at an initial low power level and subsequent higher power levels to full operation.

20 Claims, 7 Drawing Sheets

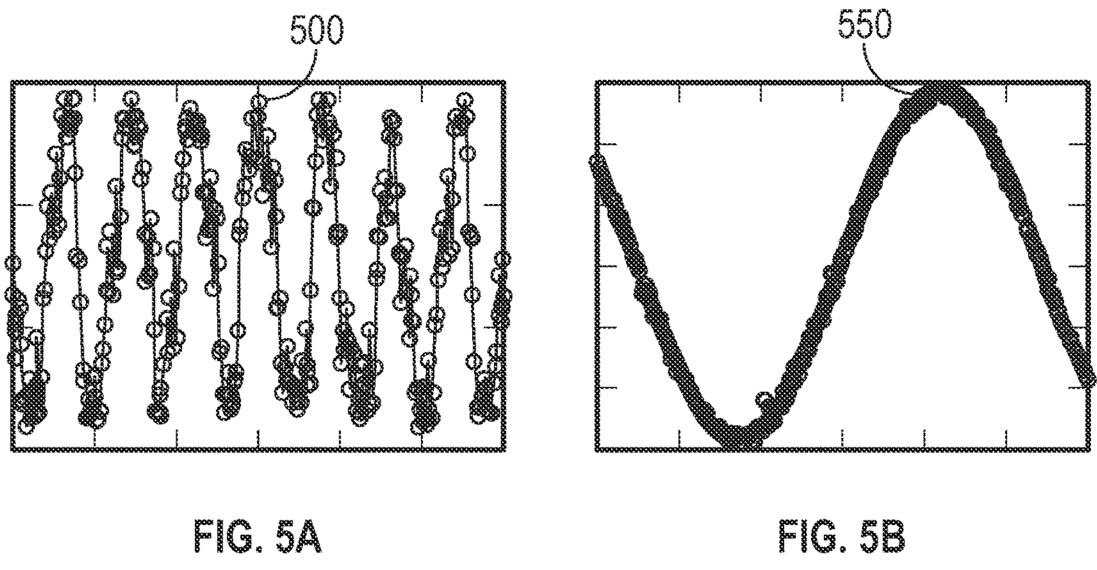
FIG. 5A
FIG. 5B
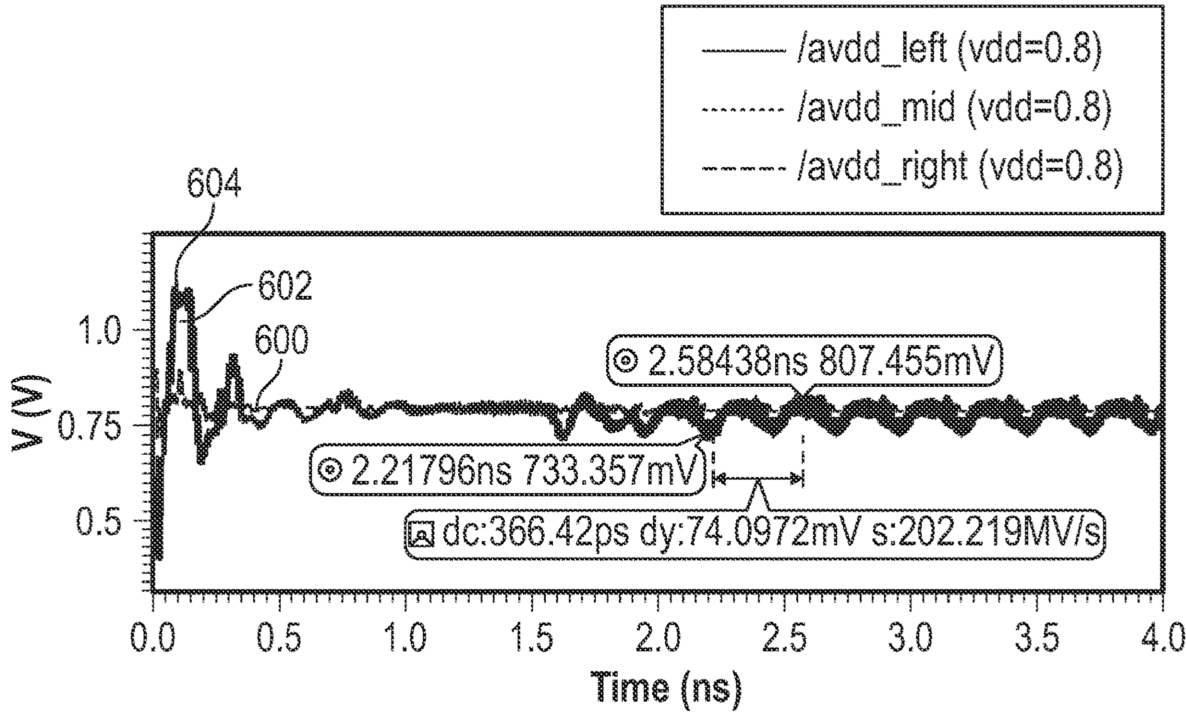
FIG. 6

CHIP AND PLATFORM LEVEL POWER MONITORING AND SEQUENCING FOR ROBUST STARTUP AND MODE SWITCHING

TECHNICAL FIELD

Aspects pertain to communications. In particular, aspects relate to inter-satellite communications.

BACKGROUND

Communications components, and particularly optical components, are subject to harsh environments. For example, some optical components are used in inter satellite communication links in low earth orbit (LEO), which can be particularly harsh due to temperature cycling and other factors. There is a general need to reduce or alleviate the effects of the harsh environments on optical and other communication components.

BRIEF DESCRIPTION OF THE DRAWINGS

FIG. 5A illustrates a data scrambling issue as can be resolved using methodologies according to some aspects.

FIG. 5B illustrates a resolved data scrambling issue according to some aspects.

FIG. 6 illustrates simulated supply with varying levels of supply inductance.

DETAILED DESCRIPTION

The following description and the drawings sufficiently illustrate specific aspects to enable those skilled in the art to practice them. Other aspects may incorporate structural, logical, electrical, process, and other changes. Portions and features of some aspects may be included in, or substituted for, those of other aspects. Aspects set forth in the claims encompass all available equivalents of those claims.

Figure 1:
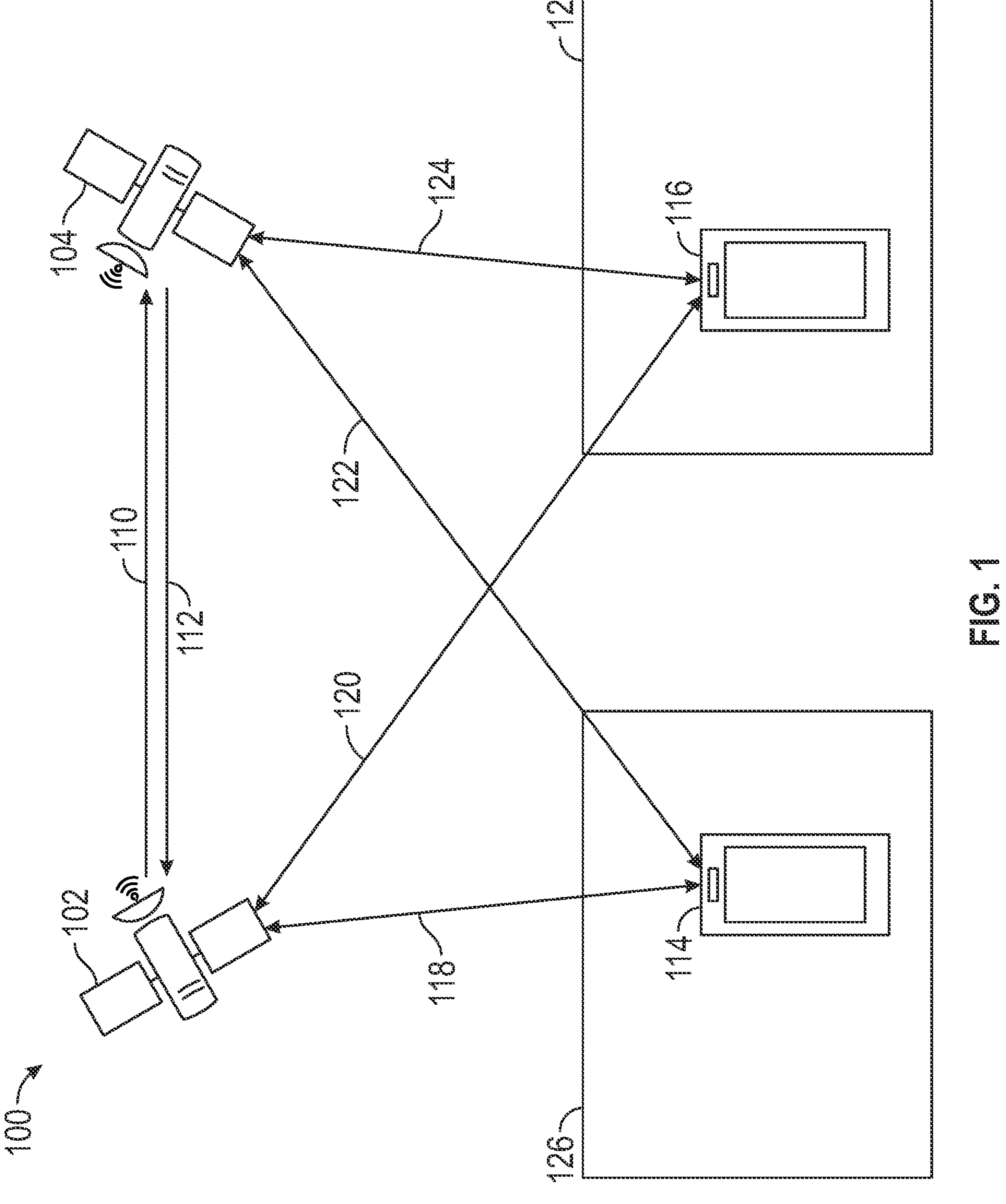
FIG. 1 is a block diagram of a communication system that can include satellite communication systems in accordance with some aspects.

FIG. 1 is a block diagram of a wireless communication system 100 that can include satellite communication systems in accordance with some aspects. The system 100 can include two or more satellites 102, 104. Furthermore, wireless systems are to be understood to include the optical spectrum, which is an extension of the radio frequency spectrum. While two satellites 102, 104 are shown, the wireless communication system 100 can include any number of satellites or other communications devices. The satellites 102, 104 can be located, for example, at a geostationary or non-geostationary orbital location. Where a satellite 102,

104 is in a non-geostationary orbit, the satellite 102, 104 may be a low earth orbit (LEO) satellite.

Satellite 102, 104 may be communicatively coupled to subscriber terminals 114, 116. The term subscriber terminals may be used to refer to a single subscriber terminal or multiple subscriber terminals. A subscriber terminal 114, 116 is adapted for communication with the satellite 102, 104. Subscriber terminals 114, 116 and satellites 102, 104 communicate over service beams, which are also known as user beams. For example, FIG. 1 shows service beams 118, 120, 122, 124 for illuminating regions 126 and 128, respectively. In many aspects, the communication system will include more than four service beams (e.g., sixty, one hundred, etc.). Each of the service beams have an uplink and a downlink for communication between subscriber terminals 114, 116 and satellites 102, 104. Although FIG. 1 only shows two subscriber terminals within each region 126, 128, a typical system may have thousands of subscriber terminals within each region. In the aspects described herein, it is assumed that the service beams (both downlink and uplink) are RF beams, as opposed to optical beams.

Subscriber terminals may include fixed and mobile subscriber terminals including, but not limited to, a cellular telephone, a wireless handset, a wireless modem, a data transceiver, a paging or position determination receiver, or mobile radio-telephone, or a headend of an isolated local network. A subscriber terminal 114, 116 may be hand-held, portable (including vehicle-mounted installations for cars, trucks, boats, trains, planes, etc.) or fixed as desired. A subscriber terminal 114, 116 may be referred to as a wireless communication device, a mobile station, a mobile wireless unit, a user, a subscriber, or a mobile. Where the communication platform of a wireless communication system is a satellite, the wireless communication system can be referred to more specifically as a satellite communication system. In accordance with certain embodiments, it is possible that a subscriber terminal 114, 116 with which one satellite 102, 104 wirelessly communicates is on a platform of or on another satellite.

Either or both satellite 102, 104 can comprise a spacecraft and one or more payloads (e.g., the communication payload, an imaging payload, etc.). The satellite 102, 104 may also include a command and data handling system and multiple power sources, such as batteries, solar panels, and one or more propulsion systems, for operating the spacecraft and the payload. The command and data handling system can be used, e.g., to control aspects of a payload and/or a propulsion system but is not limited thereto.

Each satellite 102, 104 can communicate with other satellites (e.g., each other or other satellites not shown in FIG. 1) over respective inter-satellite link (ISL) links 110, 112. For example, the satellite 102 can send data to the satellite 104 over the ISL link 110 and can receive data from the satellite 104 over the ISL link 112. ISL links 110, 112 can also be to other satellites not shown in FIG. 1, e.g., in a relay arrangement. ISL can use optical lasers to communicate between the satellites 102, 104. A communication modem for ISL includes optical components, data converters and digital logic performing baseband signal processing. These circuits are in a harsh environment of continuous high and low temperature cycles, which can have a detrimental effect on the life of the hardware (chip and/or platform). In addition to concerns regarding the harsh environment, powering up, powering down or changing the mode of operation of the modem may result in even higher impact to the power supply systems or the functional modules already experiencing constant thermal cycles.

Aspects of the disclosure address these and other concerns by hierarchically sequencing portions of circuitry (e.g., converters, dies, chiplets, or any component of communication circuitry or processing circuitry) at startup or during switching over from one mode of operation to another. Sequencing the powering on of the circuitry and components (dies, chiplets or blocks within the chip) will allow for gradual ramp up of current drag. Knowledge of major power consuming blocks will be known a priori, and the switching of modes is known at higher layers (software etc.).

Aspects can enhance and improve chip and device longevity and provide sustained and safe operation during startup, mode switching and shut down of the chip. Power ratings and power delivery requirements and specifications can be reduced, thereby reducing product and platform costs. Aspects can provide particular benefits to LEO satellite systems, which undergo harsh environmental stresses. However, aspects can be applied to any system including earth-to-satellite communications, user devices, mobile devices, vehicle systems, etc.

As mentioned earlier herein, communication modems used in inter-satellite communications primarily consist of optical components, data converters and digital logic performing baseband signal processing. Although most aspects of the disclosure relate to baseband circuitry, other portions of communications architecture can be affected by the methodologies according to aspects, including software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some aspects, the functional elements may refer to one or more processes operating on one or more processing elements.

Figure 2:
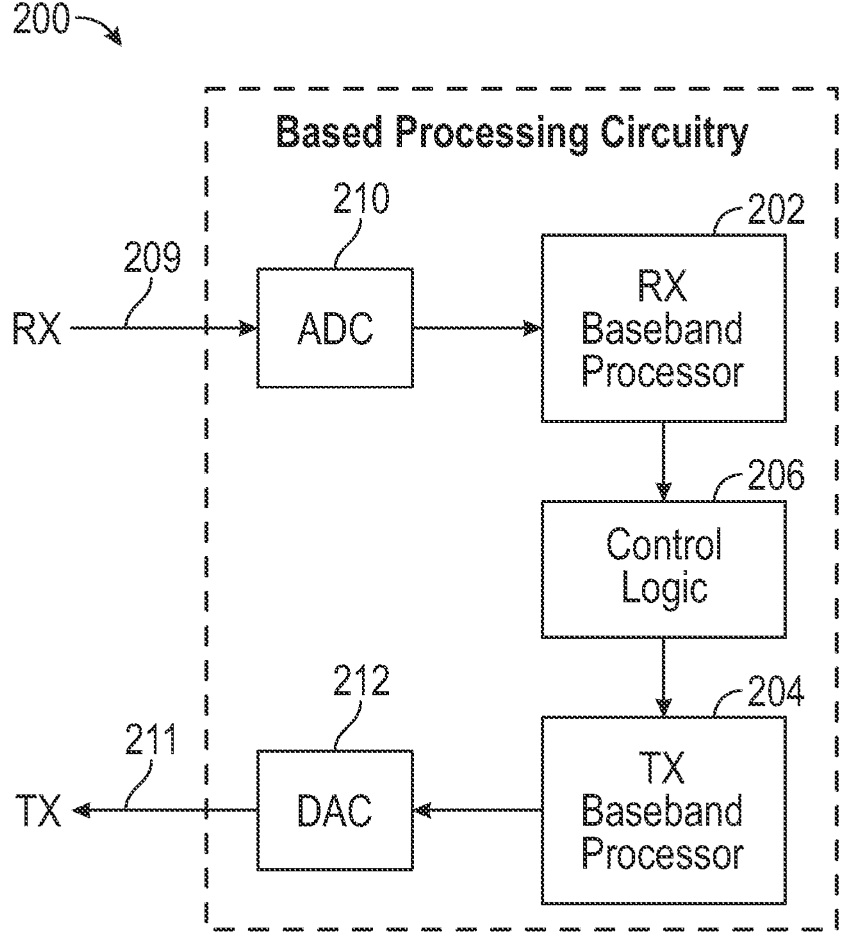
FIG. 2 illustrates a baseband processing circuitry in accordance with some aspects.

FIG. 2 illustrates a functional block diagram of baseband processing circuitry 200 in accordance with some aspects. The baseband processing circuitry 200 is one example of circuitry that may be suitable for use as the baseband processing circuitry in an inter-satellite communication system, although other circuitry configurations may also be suitable. The baseband processing circuitry 200 may include a receive baseband processor (RX BBP) 202 for processing receive baseband signals 209 and a transmit baseband processor (TX BBP) 204 for generating transmit baseband signals 211. The baseband processing circuitry 200 may also include control logic 206 for coordinating the operations of the baseband processing circuitry 200.

In some aspects the baseband processing circuitry 200 may include ADC 210 to convert analog baseband signals received from, e.g., another satellite or system to digital baseband signals for processing by the RX BBP 202. In these aspects, the baseband processing circuitry 200 may also include DAC 212 to convert digital baseband signals from the TX BBP 204 to analog baseband signals.

Data converters, for example ADC 210 or DAC 212, can be expected to operate at very high rates in inter-satellite communication or other systems. For example, a high-speed ADC can be expected to operate in ranges of gigasamples per second (Gsps), including rates of 25 Gsps, 40 Gsps, or even more. Starting up of the data converters directly at full speed of operation can cause sample misalignment within ADCs. Furthermore, large current drag to run the ADCs at full speeds might affect the power supply network and this large supply variation can further contribute to the issues both at chip and platform level. While such issues may be reduced at lower speeds, or in other systems besides inter-satellite communication systems. For example, these issues can occur in high speed optical communications such as described with reference to FIG. 1 in addition to in any other wireless or wireline electrical links.

Aspects of the disclosure address these and other concerns by providing methods, circuitry and apparatus to start components such as converters at slower clock speeds and gradually ramp up the clock speeds to full speed. This approach of gradual startup reduces the initial current consumption due to gradual increase in the clock frequency of operation.

Same or similar concepts can be applied to other components of communication systems or other systems. For example, sequencing the powering on of other circuitry (e.g., dies, chiplets or blocks within the chip) can allow for gradual ramp up of current drag. Control circuitry or upper layer circuitry can access information a priori regarding which circuitry, dies, blocks, chiplets, etc. will consume the largest amount of power, and provide ramp-up control to the relevant circuitry.

Sequencing at Chip and Platform Level

Sequencing can be done at the chip level or at an overall platform level. Data converter sequencing can occur at the platform level. Power management methods can also be implemented on other levels of a device, for example at a chip level, chiplet level, die level, or any other hierarchical level of a device. Some example devices or chips can include a digital signal processing (DSP) or baseband processor or other accelerator, which can include power sequencing or clock ramping as will be described later herein with respect to converter circuitry. Other circuitry, systems, dies or chiplets that can be controlled according to aspects described herein for power management can include radio frequency or optical front end circuitry. For example, some portions of radio frequency or optical front end circuitry can be powered up before other portions according to a sequence defined according to aspects to prevent sudden power surges or timing errors.

A chiplet can be understood to be an integrated circuit block that has been specifically designed to work with other similar chiplets to form larger more complex chips in some aspects. In such chips, a system is subdivided into functional circuit blocks, called “chiplets”, that are often made of reusable IP blocks. In the context of aspects of the disclosure, a die can include a block of semiconducting material on which circuits may be fabricated.

Sequencing of power-ups for any or all of the above devices, chips, dies, chiplets, etc. can occur through software, hardware or firmware outside of the systems being controlled or sequenced, with feedback from power monitors concerning current draw or power consumption. In some aspects, dynamic or machine learning can occur while systems are operating in the expected environment. For example, learning and adjustment can be performed based on aging of the circuits and their components, or based on chip variations as the chips go through a number of thermal cycles, or based on different scenarios of mode switching that could not be simulated during the development of the relevant die, chip, chiplet, or circuitry. Similarly, such simulation could lead to long testing cycles during development. A baseline or predicted power consumption scenario can be defined during chip development and used as a starting point for continuous tuning/learning of the power management. In still other examples, the learning and tuning algorithm itself can be updated exclusively based on the individual platform's/chip's aging or other environmental conditions. In some example aspects, learning scenarios can be developed from a baseline given knowledge of the order of power up of input/output I/O components, interfaces, cores, or dedicated accelerator blocks.

Sequencing and control of power up sequences can be performed by a separate control circuitry or processor, by a primary chip in cases of multi-chip packages (MCP) or by a portion of a single large chip, e.g., a server central processing unit (CPU). Some or all of these control circuitry units may be capable of online learning to manage power variations whereas other dies, chips, chiplets, converters, etc. may not be able to perform online learning but may contribute data or feedback to control circuitry.

Figure 3:
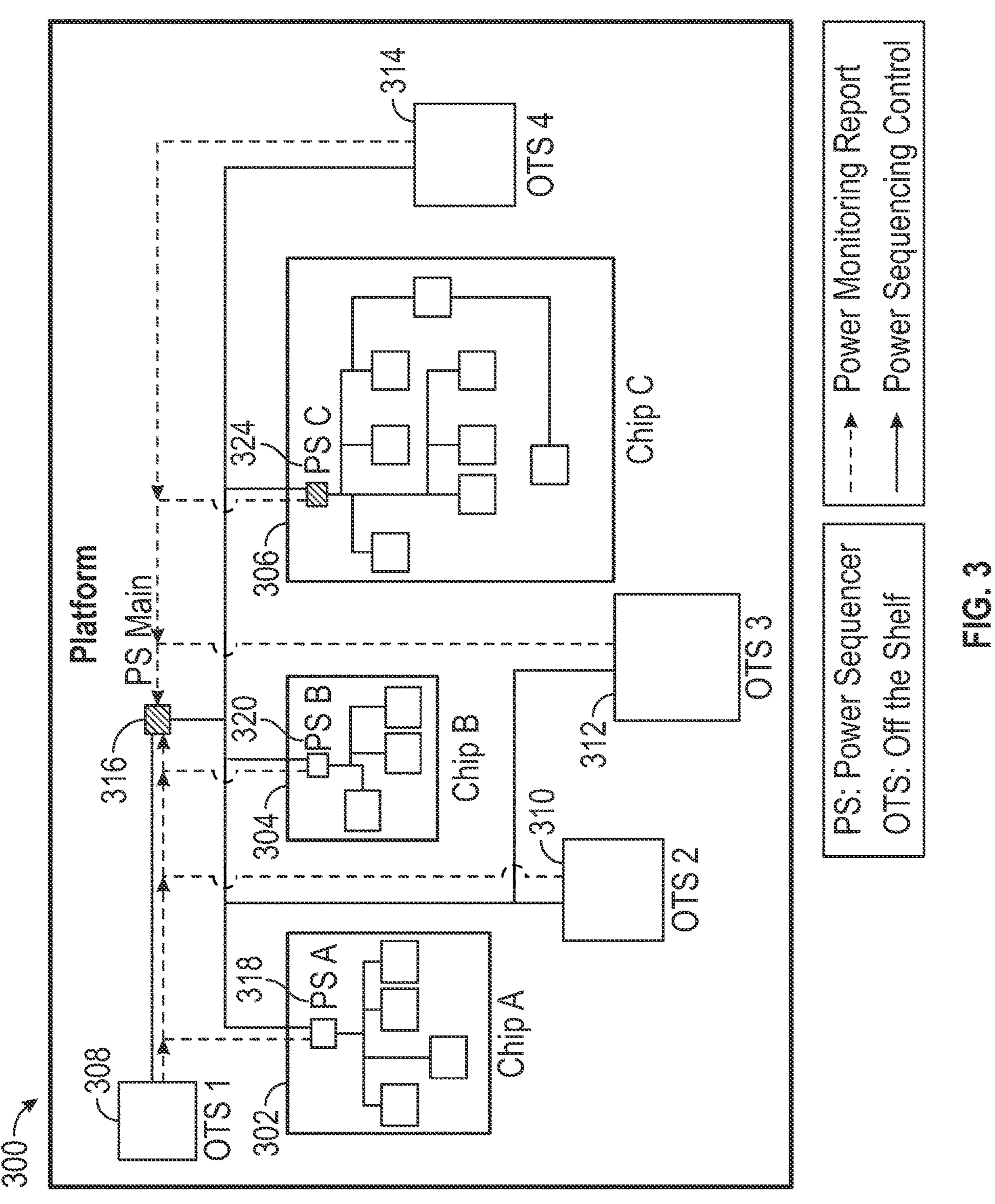
FIG. 3 illustrates a platform level setup for power control and sequencing in accordance with some aspects.

FIG. 3 illustrates a platform level setup for power control and sequencing in accordance with some aspects. In FIG. 3, a platform 300 includes various chips 302, 304, 306 for example accelerator chips, DSP chips, memory, etc. and a number of off the shelf components 308, 310, 312, 314, which can include for example CPU, FPGA devices, data converters, optical and photonics circuitry, radio frequency ICs, network switches, etc. The platform 300 includes a main sequencer 316 that can communicate with sequencers 318, 320, 324 of respective chips 302, 304, 306. The platform architecture supports this hierarchical sequencing starting from the platform level. The platform architecture also provides reporting and feedback regarding power consumption. In alternative aspects, the platform 300 can derive a power draw number or other parameter based on knowledge or feedback regarding current draw. The platform 300 can also provide any of the sequencing, learning, and control functionalities described above.

Figure 4:
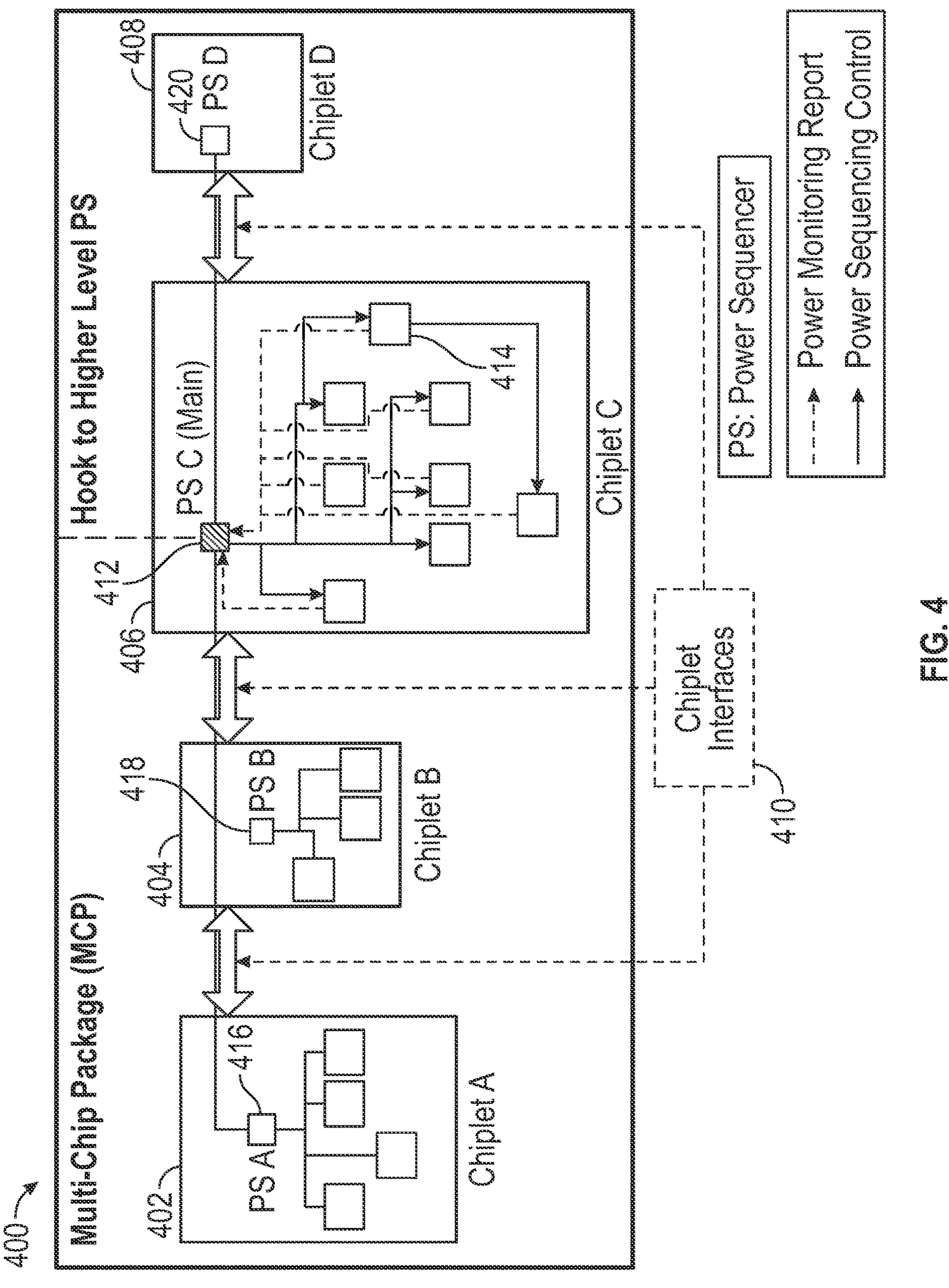
FIG. 4 illustrates a multi-chip package comprising multiple chiplets controlled through an interface in accordance with some aspects.

FIG. 4 illustrates a multi-chip package 400 comprising multiple chiplets 402, 404, 406, 408 controlled through an interface 410 in accordance with some aspects. As shown, each of the chiplets 402, 404, 406, 408 is interconnected to at least one other chip through interface 410. In some aspects, not all chiplets 402, 404, 406, 408 will be subject to controls as described earlier herein. Chiplet 406 can include a primary sequencer 412 that manages blocks 414 of chiplet 406 in addition to controlling other chiplets 402, 404, 406, in aspects through communication with sequencers or control circuitry 416, 418, 420 of respective chiplets 402, 404, and 408. The power sequencer in chiplet C primary sequencer 412 can be a dedicated hardware controller or a processor that manages the operations described above collectively between the subsidiary chiplets 402, 404 and 408 and the blocks within chiplet 406. While chiplets are described, interconnects can also be between one or more dies on which chiplets and other circuitry can be constructed, attached, etc.

Robust Startup of Data Converters

Referring again to FIG. 2, as mentioned earlier herein, very high-speed data converters (ADCs and DACs beyond 40 Gsps) can present challenges regarding robust start-up sequence and power handling. However, there is no particular speed threshold at which challenges are seen; instead, limitations and threshold depend on the supply voltage and process technology, process nodes, process skew, threshold voltage, etc. To reach these speeds in an ADC, time-interleaving of many (e.g., at least 30 or even more than 30) sub-ADCs is typically employed, which requires sequential alignment of all sub-ADC clocks to guarantee that the interleaved ADC output samples are properly sequential. However, there is not a fixed interleaving factor threshold for which sequential alignment becomes a problem. Furthermore, in DAC implementations the interleaving factor may be much smaller (2× or 4×), but multi-phase clock generation may still present a challenge. This phase alignment is especially difficult to guarantee at high frequencies where short clock periods (<100 ps) strictly limit setup and hold timing margins of the clock dividers and circuits that may be used to retime reset signals to guarantee a correct start-up order. This issue may be present in high-speed clock generation for DACs as well. Sub-ADC or sub-DAC sample misalignment may go undetected until the entire system is brought up (for example) requiring a full reboot or requiring a dedicated calibration algorithm. This sequence may be random every time the data convertor is started.

FIG. 5A illustrates a data scrambling issue as can be resolved using methodologies according to some aspects, and FIG. 5B illustrates a resolved data scrambling issue according to some aspects.

In FIG. 5A, raw ADC data, in which the 48 data samples read by the on-chip SRAM (corresponding to the 48 sub-ADC output streams) are misaligned relative to each other, leading to scrambled data in curve 500. In FIG. 5B, curve 550 illustrates the decoded data after shifting the 48 data streams relative to each other to obtain the correct sequence.

Another concern with high-speed converter reliability is the large supply ripple that may be introduced due to the surge of current during converter power-on. When a large supply routing inductance is present over the converter, this can lead to a large supply transient that may affect the clock divider functionality, contribute to sample misalignment, or cause incorrect triggering of reset/enable signals within the converter that affect its functionality.

FIG. 6 illustrates the simulated supply of the 48 Gsps ADC clock distribution network with varying levels of supply inductance when ~50 mA is suddenly drawn from the supply at t=0 due to the ADC clocking circuitry. Curve 600 shows the 0.8V supply with 50 pH supply inductance, while curve 602 and curve 604 illustrate the supply response with 500 picohenry (pH) and 1 nanohenry (nH) inductance, respectively. This leads to >200 mV simulated ripple that may be larger if the ADC current draw is larger and could affect start-up reliability.

Aspects of the disclosure address these and other concerns by starting the ADC with a lower frequency divided clock and then ramping up the clock speed such that the start-up current surge is limited. Starting the ADC with a lower frequency clock would also relax the timing requirements on the input dividers during initial start-up to help ensure that the desired sub-ADC ordering is maintained.

Figures 7, 8:
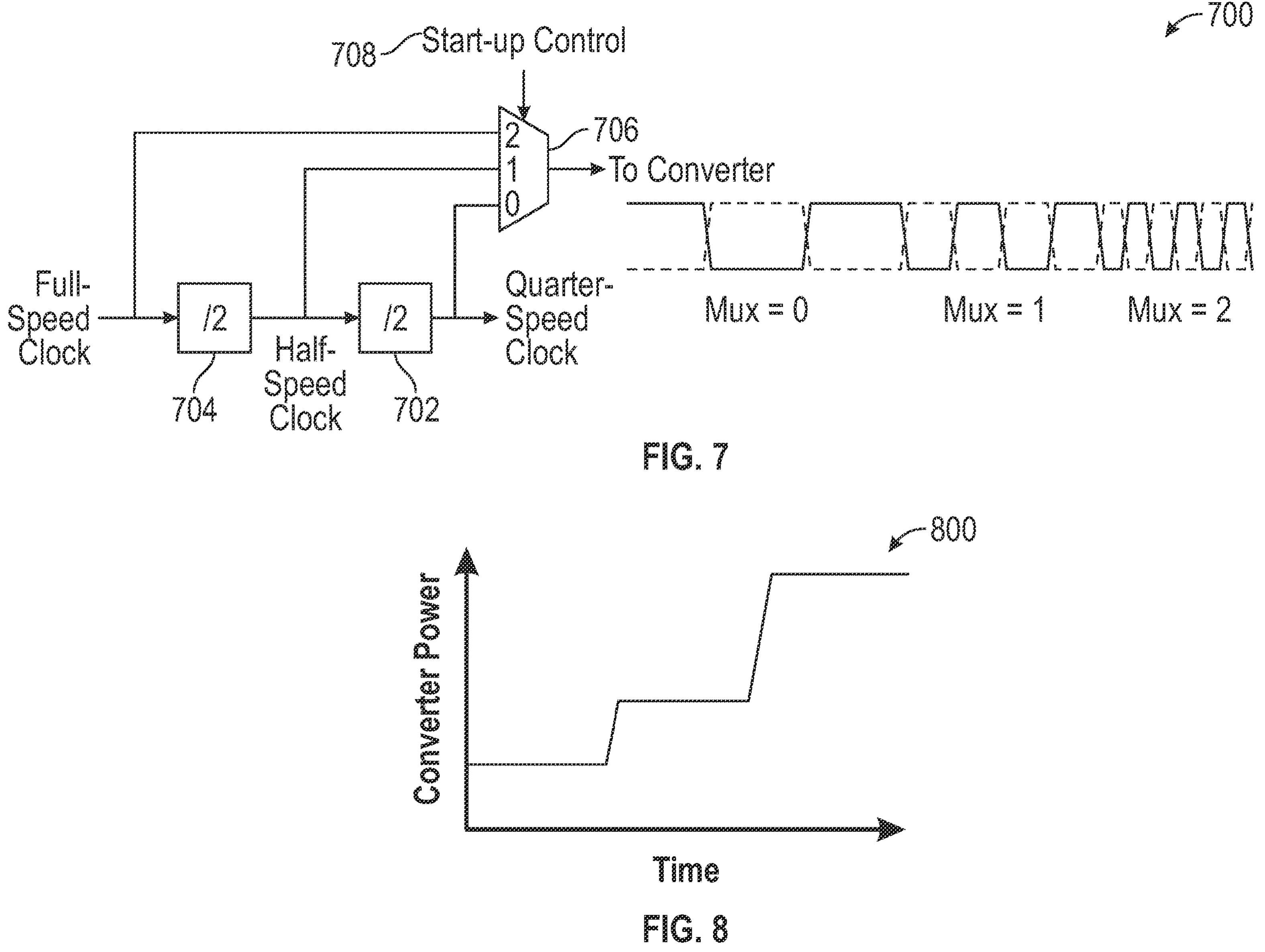
FIG. 7 illustrates a circuit for ramping a data converter clock according to some aspects.
FIG. 8 illustrates example data converter load versus time according to some aspects.

FIG. 7 illustrates a circuit 700 for ramping a converter clock according to some aspects. The circuit 700 includes a network to start from a slower clock speed, gradually ramping up to full speed. In the example shown, two divide-by-two blocks 702 and 704 are used to generate half-rate and quarter-rate clocks, and a multiplexer 706 can select which clock is fed to the converter input. The start-up control 708 would provide one value (e.g., "0") during initial start-up to apply a quarter-rate clock, then increase to a second value (e.g., "1") to apply a half-rate clock, and then increase to a third value (e.g., "2") to provide the full-speed clock to the converter. While three levels are shown, aspects are not limited thereto and can include fewer than three and more than three levels. The control bits on the multiplexer 706 can use retiming logic to avoid glitches in the output clock.

FIG. 8 illustrates example converter load versus time 800 according to some aspects. As seen in FIG. 8, methods according to some aspects reduce the peak instantaneous change in current consumption due to gradual increase in converter clock frequency. Because converter power consumption is typically dominated by dynamic switching power, the quarter-speed clock will draw a quarter of the full-rate converter power. With the proposed scheme, the maximum instantaneous converter current increase would be half that of a typical architecture. Such a power up technique is one such approach at the circuit level that can be managed/controlled by higher level (chip/system-level) power management module. In a system with multiple converters (e.g., quadrature I+Q ADCs or horizontal+vertical polarizations of quadrature ADCs), the system-level power management module may also control the relative start-up sequence of each converter to avoid powering on all converters simultaneously, which would lead to a significant jump in system-level power consumption. While some examples relate to ADC ordering, aspects can also be provided to digital-to-analog converters (DACs) as well

Other Systems and Apparatuses

Figure 9:
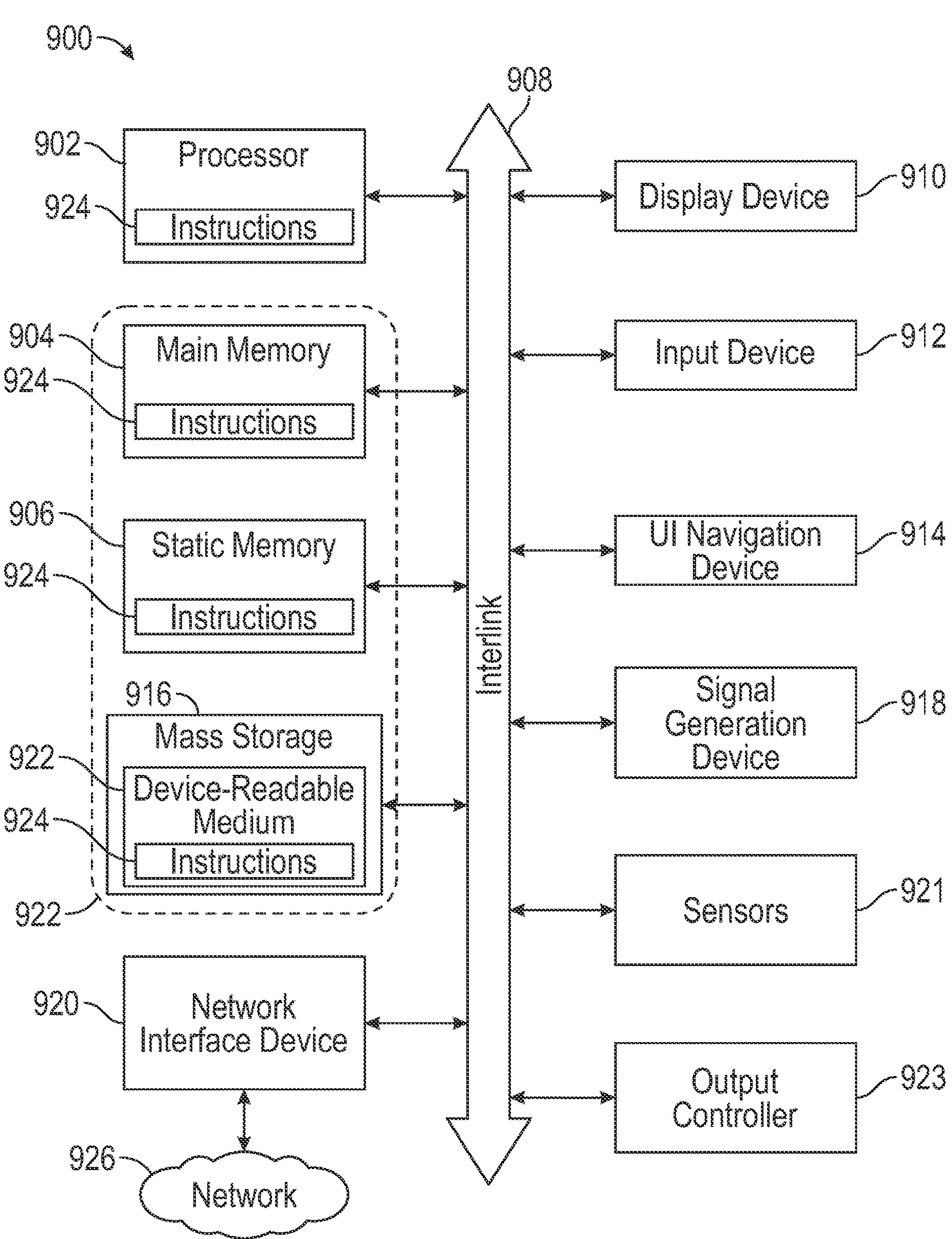
FIG. 9 is a procedure transmitting packets performed by a multi-link device (MLD), in accordance with some aspects.

FIG. 9 illustrates a block diagram of a computing device 900 that can be included in, for example, a satellite 102, 104 of FIG. 1, or of any control circuitry for controlling according to aspects described above, or for communicating with any of the satellites 102, 104. In alternative aspects, the communication device 900 may operate as a standalone device or may be connected (e.g., networked) to other communication devices. In some aspects, the communication device 900 can use one or more of the techniques and circuits discussed herein, in connection with any of FIG. 1-FIG. 8.

Circuitry (e.g., processing circuitry) is a collection of circuits implemented in tangible entities of the device 900 that include hardware (e.g., simple circuits, gates, logic, etc.). Circuitry membership may be flexible over time. Circuitries include members that may, alone or in combination, perform specified operations when operating. In an example, hardware of the circuitry may be immutably designed to carry out a specific operation (e.g., hardwired). In an example, the hardware of the circuitry may include variably connected physical components (e.g., execution units, transistors, simple circuits, etc.) including a machine readable medium physically modified (e.g., magnetically, electrically, moveable placement of invariant massed particles, etc.) to encode instructions of the specific operation.

In connecting the physical components, the underlying electrical properties of a hardware constituent are changed, for example, from an insulator to a conductor or vice versa. The instructions enable embedded hardware (e.g., the execution units or a loading mechanism) to create members of the circuitry in hardware via the variable connections to carry out portions of the specific operation when in operation. Accordingly, in an example, the machine readable medium elements are part of the circuitry or are communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry at a different time. Additional examples of these components with respect to the device 900 follow.

In some aspects, the device 900 may operate as a standalone device or may be connected (e.g., networked) to other devices. In a networked deployment, the communication device 900 may operate in the capacity of a server communication device, a client communication device, or both in server-client network environments. In an example, the communication device 900 may act as a peer communication device in peer-to-peer (P2P) (or other distributed) network environment. The communication device 900 may be a UE, eNB, PC, a tablet PC, a STB, a PDA, a mobile telephone, a smart phone, a web appliance, a network router, switch or bridge, or any communication device capable of executing instructions (sequential or otherwise) that specify actions to be taken by that communication device. Further, while only a single communication device is illustrated, the term "communication device" shall also be taken to include any collection of communication devices that individually or jointly execute a set (or multiple sets) of instructions to perform any one or more of the methodologies discussed herein, such as cloud computing, software as a service (SaaS), other computer cluster configurations.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a communication device-readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Computing device 900 may include a hardware processor 902 (e.g., a central processing unit (CPU), a graphics processing unit (GPU), a hardware processor core, or any combination thereof), a main memory 904, a static memory 906, and mass storage device 916 (e.g., hard drive, tape drive, flash storage, or other block or storage devices), some or all of which may communicate with each other via an interlink (e.g., bus) 908.

The communication device 900 may further include a display unit 910, an alphanumeric input device 912 (e.g., a keyboard), and a user interface (UI) navigation device 914 (e.g., a mouse). In an example, the display unit 910, input device 912 and UI navigation device 914 may be a touch screen display. The communication device 900 may additionally include a signal generation device 918 (e.g., a speaker), a network interface device 920, and one or more sensors 921, such as a global positioning system (GPS)

sensor, compass, accelerometer, or another sensor. The communication device 900 may include an output controller 923, such as a serial (e.g., universal serial bus (USB), parallel, or other wired or wireless (e.g., optical, infrared (IR), near field communication (NFC), etc.) connection to communicate or control one or more peripheral devices (e.g., a printer, card reader, etc.).

The mass storage device 916 may include a communication device-readable medium 922, on which is stored one or more sets of data structures or instructions 924 (e.g., software) embodying or utilized by any one or more of the techniques or functions described herein. In some aspects, registers of the processor 902, the main memory 904, the static memory 906, and/or the mass storage device 916 may be, or include (completely or at least partially), the device-readable medium 922, on which is stored the one or more sets of data structures or instructions 924, embodying or utilized by any one or more of the techniques or functions described herein. In an example, one or any combination of the hardware processor 902, the main memory 904, the static memory 906, or the mass storage device 916 may constitute the device-readable medium 922.

As used herein, the term "device-readable medium" is interchangeable with "computer-readable medium" or "machine-readable medium." While the communication device-readable medium 922 is illustrated as a single medium, the term "communication device-readable medium" may include a single medium or multiple media (e.g., a centralized or distributed database, and/or associated caches and servers) configured to store the one or more instructions 924.

The term "communication device-readable medium" may include any medium that is capable of storing, encoding, or carrying instructions for execution by the communication device 900 and that cause the communication device 900 to perform any one or more of the techniques of the present disclosure, or that is capable of storing, encoding, or carrying data structures used by or associated with such instructions. Non-limiting communication device-readable medium examples may include solid-state memories, and optical and magnetic media. Specific examples of communication device-readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks. In some examples, communication device-readable media may include non-transitory communication device-readable media. In some examples, communication device-readable media may include communication device-readable media that is not a transitory propagating signal.

The instructions 924 may further be transmitted or received over a communications network 926 using a transmission medium via the network interface device 920 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others. In an example, the network interface device 920 may include one or more physical jacks (e.g., Ethernet, coaxial, or phone jacks) or one or more antennas to connect to the communications network 926. In an example, the network interface device 920 may include a plurality of antennas to wirelessly communicate using at least one of single-input multiple-output (SIMO), MIMO, or multiple-input single-output (MISO) techniques. In some examples, the network interface device 920 may wirelessly communicate using Multiple User MIMO techniques.

The term "transmission medium" shall be taken to include any intangible medium that is capable of storing, encoding, or carrying instructions for execution by the communication device 900, and includes digital or analog communications signals or other intangible medium to facilitate communication of such software. In this regard, a transmission medium in the context of this disclosure is a device-readable medium.

Discussions herein utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" and "a plurality", as used herein, include, for example, "multiple" or "two or more". For example, "a plurality of items" includes two or more items.

References to "one aspect", "an aspect", "an example aspect," "some aspects," "demonstrative aspect", "various aspects" etc., indicate that the aspect(s) so described may include a particular feature, structure, or characteristic, but not every aspect necessarily includes the particular feature, structure, or characteristic. Further, repeated use of the phrase "in one aspect" does not necessarily refer to the same aspect, although it may.

As used herein, unless otherwise specified the use of the ordinal adjectives "first", "second", "third" etc., to describe a common object, merely indicate that different instances of like objects are being referred to and are not intended to imply that the objects so described must be in a given sequence, either temporally, spatially, in ranking, or in any other manner.

The term "wireless device", as used herein, includes, for example, a device capable of wireless communication, a communication device capable of wireless communication, a communication station capable of wireless communication, a portable or non-portable device capable of wireless communication, or the like. In some demonstrative aspects, a wireless device may be or may include a peripheral that is integrated with a computer, or a peripheral that is attached to a computer. In some demonstrative aspects, the term "wireless device" may optionally include a wireless service.

The term "communicating" as used herein with respect to a communication signal includes transmitting the communication signal and/or receiving the communication signal. For example, a communication unit, which is capable of communicating a communication signal, may include a transmitter to transmit the communication signal to at least one other communication unit, and/or a communication receiver to receive the communication signal from at least one other communication unit. The verb communicating may be used to refer to the action of transmitting and/or the action of receiving. In one example, the phrase "communicating a signal" may refer to the action of transmitting the signal by a first device and may not necessarily include the action of receiving the signal by a second device. In another example, the phrase "communicating a signal" may refer to the action of receiving the signal by a first device and may not necessarily include the action of transmitting the signal by a second device.

Some demonstrative aspects may be used in conjunction with a wireless communication network communicating over a frequency band above 45 Gigahertz (GHz), e.g., 60 GHz. However, other aspects may be implemented utilizing any other suitable wireless communication frequency bands, for example, an Extremely High Frequency (EHF) band (the millimeter wave (mmWave) frequency band), e.g., a frequency band within the frequency band of between 20 GHz and 300 GHz, a frequency band above 45 GHz, a frequency band below 20 GHz, e.g., a Sub 1 GHz (S1G) band, a 2.4 GHz band, a 5 GHz band, a WLAN frequency band, a WPAN frequency band, a frequency band according to the WGA specification, and the like.

As used herein, the term "circuitry" may, for example, refer to, be part of, or include, an Application Specific Integrated Circuit (ASIC), an integrated circuit, an electronic circuit, a processor (shared, dedicated, or group), and/or memory (shared, dedicated, or group), that execute one or more software or firmware programs, a combinational logic circuit, and/or other suitable hardware components that provide the described functionality. In some aspects, circuitry may include logic, at least partially operable in hardware. In some aspects, the circuitry may be implemented as part of and/or in the form of a radio virtual machine (RVM), for example, as part of a Radio processor (RP) configured to execute code to configured one or more operations and/or functionalities of one or more radio components.

The term "logic" may refer, for example, to computing logic embedded in circuitry of a computing apparatus and/or computing logic stored in a memory of a computing apparatus. For example, the logic may be accessible by a processor of the computing apparatus to execute the computing logic to perform computing functions and/or operations. In one example, logic may be embedded in various types of memory and/or firmware, e.g., silicon blocks of various chips and/or processors. Logic may be included in, and/or implemented as part of, various circuitry, e.g., radio circuitry, receiver circuitry, control circuitry, transmitter circuitry, transceiver circuitry, processor circuitry, and/or the like. In one example, logic may be embedded in volatile memory and/or non-volatile memory, including random access memory, read only memory, programmable memory, magnetic memory, flash memory, persistent memory, and/or the like. Logic may be executed by one or more processors using memory, e.g., registers, buffers, stacks, and the like, coupled to the one or more processors, e.g., as necessary to execute the logic.

The term "antenna" or "antenna array," as used herein, may include any suitable configuration, structure and/or arrangement of one or more antenna elements, components, units, assemblies and/or arrays. In some aspects, the antenna may implement transmit and receive functionalities using separate transmit and receive antenna elements. In some aspects, the antenna may implement transmit and receive functionalities using common and/or integrated transmit/receive elements. The antenna may include, for example, a phased array antenna, a single element antenna, a set of switched beam antennas, and/or the like.

Additional Notes and Aspects

Example 1 is an apparatus comprising: at least two circuit portions having separate power sequencer circuitry; and processing circuitry configured to control at least one portion of the at least two circuit portions to operate at an initial low power level and subsequent higher power levels to full operation.

In Example 2, the subject matter of Example 1 can optionally include wherein at least one of the at least two circuit portions includes converter circuitry.

In Example 3, the subject matter of Example 2 can optionally include wherein the converter circuitry includes analog to digital converter (ADC) circuitry.

In Example 4, the subject matter of Example 2 can optionally include wherein the converter circuitry includes digital to analog converter (DAC) circuitry.

In Example 5, the subject matter of Example 2 can optionally include wherein the converter circuitry is configured to operate at least at 30 gigasamples per second (Gsps).

In Example 6, the subject matter of any of Examples 1-5 can optionally include wherein controlling the at least one portion comprises controlling clock speed to execute at an initial speed and subsequently at a higher speed.

In Example 7, the subject matter of Example 2 can optionally include wherein the processing circuitry is configured to control a multiplexer to select one of at least two clock signals having different speeds.

In Example 8, the subject matter of any of Examples 1-7 can optionally include wherein the processing circuitry is further configured to adapt the control based on variations or aging of the apparatus or on variations of a physical environment of the apparatus.

In Example 9, the subject matter of any of Examples 1-8 can optionally include wherein the processing circuitry is further configured to implement an adaptive or machine learning algorithm to adapt the control during operation of the apparatus.

In Example 10, the subject matter of any of Examples 1-9 can optionally include wherein the apparatus includes digital signal processing (DSP) circuitry.

In Example 11, the subject matter of any of Examples 1-10 can optionally include wherein the apparatus includes radio frequency (RF) circuitry or optical front end circuitry.

Example 12 is a system comprising: memory to store data indicating which portions of a plurality of circuitry portions are predicted to consume at least a threshold amount of power, and data indicating switching modes and sequences for the plurality of portions; at least two circuitry portions having separate power sequencer circuitry; and at least one system power sequencer circuitry component configured to control a power up sequence of the at least two circuitry portions.

In Example 13, the subject matter of Example 12 can optionally include wherein at least one of the at least two circuitry portions comprises a chiplet.

In Example 14, the subject matter of any of Examples 12-13 can optionally include wherein the system comprises a multi-chip system.

In Example 15, the subject matter of any of Examples 12-14 can optionally include at least one circuitry portion that does not include power sequencer circuitry.

In Example 16, the subject matter of any of Examples 12-15 can optionally include wherein at least one of the at least two circuitry portions includes converter circuitry.

In Example 17, the subject matter of Example 16 can optionally include a multiplexer configured to control clock speed of the converter circuitry to execute at an initial speed and subsequently at a higher speed.

Example 18 is a computer-readable medium including instructions that, when implemented on a processor, cause the processor to perform operations comprising: controlling at least one portion of at least two circuit portions to operate at an initial low power level and subsequent higher power levels to full operation, wherein controlling the at least one portion comprises controlling clock speed to execute at an initial speed and subsequently at a higher speed.

In Example 19, the subject matter of Example 19 can include wherein the operations further include adapting the control based on variations or aging of an apparatus or on variations of a physical environment of the apparatus.

In Example 20, the subject matter of any of Examples 18-19 can include wherein the operations further include providing communication regarding the control to at least one other chiplet or processor of a platform.

The above detailed description includes references to the accompanying drawings, which form a part of the detailed description. The drawings show, by way of illustration, specific aspects in which the invention can be practiced. These aspects are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other aspects can be used, such as by one of ordinary skill in the art upon reviewing the above description. The Abstract is provided to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed aspect. Thus, the following claims are hereby incorporated into the Detailed Description, with each claim standing on its own as a separate aspect, and it is contemplated that such aspects can be combined with each other in various combinations or permutations. The scope of the invention should be determined with reference to the appended claims, along with the full scope of equivalents to which such claims are legally entitled.

We claim:

1. An apparatus comprising:

at least two circuit portions having separate power sequencer circuitry; and processing circuitry configured to communicate with the separate power sequencer circuitry of each of the at least two circuit portions to control at least one portion of the at least two circuit portions to operate at an initial low power level and subsequent higher power levels to full operation, the at least two circuit portions being controlled to power up in a defined sequence such that different circuit portions of the at least two circuit portions reach full operation at different times.

2. The apparatus of claim 1, wherein at least one of the at least two circuit portions includes converter circuitry.

3. The apparatus of claim 2, wherein the converter circuitry includes analog to digital converter (ADC) circuitry.

4. The apparatus of claim 2, wherein the converter circuitry includes digital to analog converter (DAC) circuitry.

5. The apparatus of claim 2, wherein the converter circuitry is configured to operate at least at 30 gigasamples per second (Gsps).

6. The apparatus of claim 1, wherein controlling the at least one portion comprises controlling clock speed to execute at an initial speed and subsequently at a higher speed.

7. The apparatus of claim 2, wherein the processing circuitry is configured to control a multiplexer to select one of at least two clock signals having different speeds.

8. The apparatus of claim 1, wherein the processing circuitry is further configured to adapt the control based on variations or aging of the apparatus or on variations of a physical environment of the apparatus.

9. The apparatus of claim 1, wherein the processing circuitry is further configured to implement an adaptive or machine learning algorithm to adapt the control during operation of the apparatus.

10. The apparatus of claim 1, wherein the apparatus includes digital signal processing (DSP) circuitry.

11. The apparatus of claim 1, wherein the apparatus includes radio frequency (RF) circuitry or optical front end circuitry.

12. A system comprising:

memory to store data indicating which portions of a plurality of circuitry portions are predicted to consume at least a threshold amount of power, and data indicating switching modes and sequences for the plurality of portions;

at least two circuitry portions having separate power sequencer circuitry; and at least one system power sequencer circuitry component configured to communicate with the separate power sequencer circuitry of each of the at least two circuitry portions to control a power up sequence of the at least two circuitry portions, the at least two circuitry portions being controlled to power up in a defined sequence such that different circuitry portions of the at least two circuitry portions reach full operation at different times.

13. The system of claim 12, wherein at least one of the at least two circuitry portions comprises a chiplet.

14. The system of claim 12, wherein the system comprises a multi-chip system.

15. The system of claim 12, further comprising at least one circuitry portion that does not include power sequencer circuitry.

16. The system of claim 12, wherein at least one of the at least two circuitry portions includes converter circuitry.

17. The system of claim 16, further comprising a multiplexer configured to control clock speed of the converter circuitry to execute at an initial speed and subsequently at a higher speed.

18. A non-transitory computer-readable medium including instructions that, when implemented on a processor, cause the processor to perform operations comprising:

controlling at least one portion of at least two circuit portions to operate at an initial low power level and subsequent higher power levels to full operation, wherein controlling the at least one portion comprises controlling clock speed to execute at an initial speed and subsequently at a higher speed, the at least two circuit portions being controlled to power up in a defined sequence such that different circuit portions of the at least two circuit portions reach full operation at different times.

19. The non-transitory computer-readable medium of claim 18, wherein the operations further include adapting the control based on variations or aging of an apparatus or on variations of a physical environment of the apparatus.

20. The non-transitory computer-readable medium of claim 18, wherein the operations further include providing communication regarding the control to at least one other chiplet or processor of a platform.

* * * * *